United States Patent [19]

Koehler

[11] Patent Number: 4,595,871
[45] Date of Patent: Jun. 17, 1986

[54] STEPPING MOTOR OF HYBRID MULTI-PHASE TYPE AND DEVICE FOR ITS CONTROL

[75] Inventor: Gérard Koehler, Ville D'Avray, France

[73] Assignee: La Telemecanique Electrique, Nanterre, France

[21] Appl. No.: 668,826

[22] Filed: Nov. 6, 1984

[30] Foreign Application Priority Data

Nov. 16, 1983 [FR] France .................. 83 18187
Oct. 12, 1984 [EP] European Pat. Off. ....... 84 402 058.6

[51] Int. Cl.$^4$ .................................... H02P 8/00
[52] U.S. Cl. ............................. 318/696; 318/685
[58] Field of Search ............. 318/696, 685; 310/49 R, 310/156

[56] References Cited

U.S. PATENT DOCUMENTS

| 3,343,014 | 9/1967 | Giles | 310/49 |
| 3,671,841 | 6/1972 | Hoffmann | 318/696 |
| 4,031,457 | 6/1977 | Oberbeck | 323/92 |
| 4,306,164 | 12/1981 | Itoh et al. | 310/49 R |

FOREIGN PATENT DOCUMENTS

| 2732364 | 2/1979 | Fed. Rep. of Germany . |
| 1250276 | 12/1960 | France . |
| 2102530 | 4/1972 | France . |
| 2439502 | 5/1980 | France . |
| 53-70313 | 6/1978 | Japan . |
| 57-95174 | 12/1982 | Japan . |

*Primary Examiner*—William M. Shoop, Jr.
*Assistant Examiner*—Saul M. Bergmann
*Attorney, Agent, or Firm*—Young & Thompson

[57] ABSTRACT

The rotating or linear stepping motor comprises a permanent magnet equipped with pole pieces the ends of which define gaps.

This motor comprises a second permanent magnet so that its primary has a magnet (6) equipped with pole pieces (4) and (7) and its secondary has a magnet (9) equipped with pole pieces (5) and (10). Each magnet (6), (9) is subjected to the field of a winding (2) which is perpendicular to the direction of its magnetization and directed towards one or the other of the ends of each pole piece so as to create a transfer of the flux of the magnets. In the case of a rotating motor, the winding (2) preferably has a toroidal shape with circular cross-section and the path of the flux around a circular section of winding also has an approximately circular shape so that each part of the winding (2) is surrounded by iron of minimum length. Each gap is flanked by two magnets and the residual holding torque is strengthened. This torque can be cancelled by a releasing pulse.

Use of a rotating or linear stepping motor, particularly in robotics.

14 Claims, 15 Drawing Figures

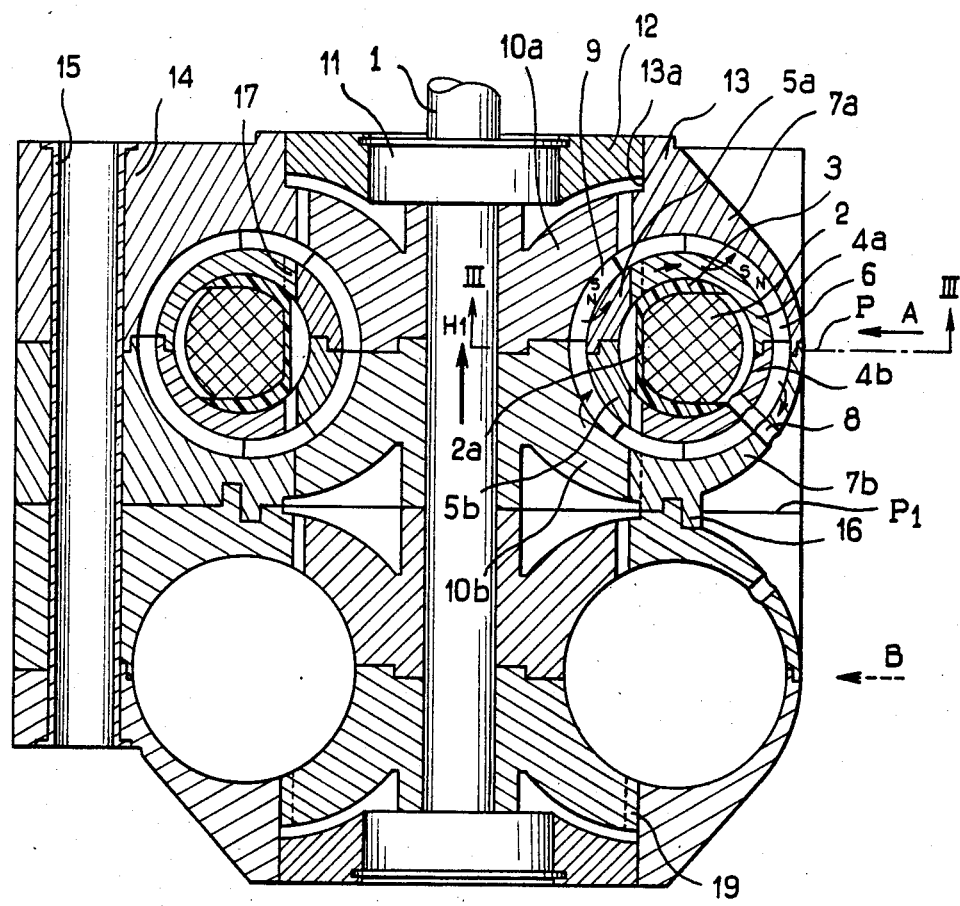
FIG_1
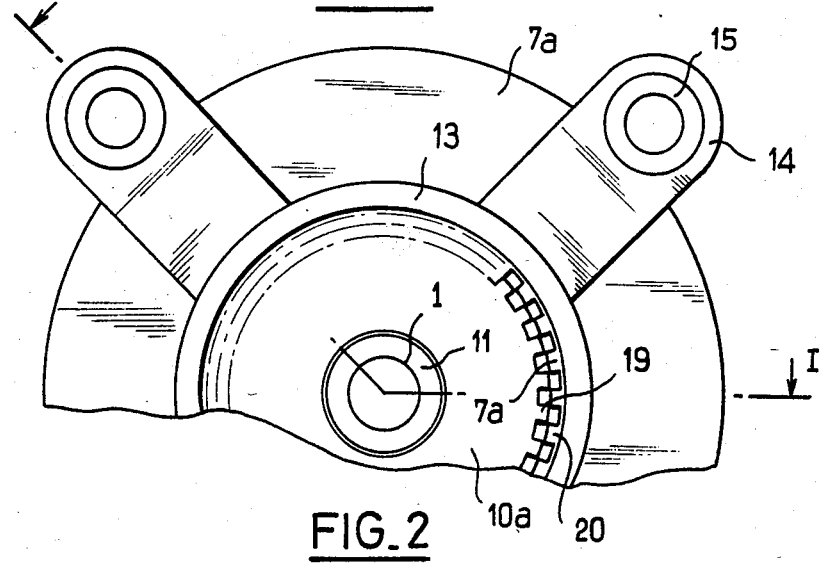
FIG_2

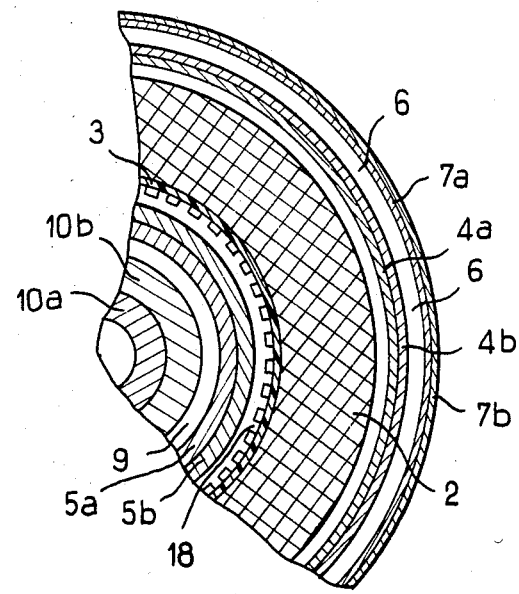
FIG_3
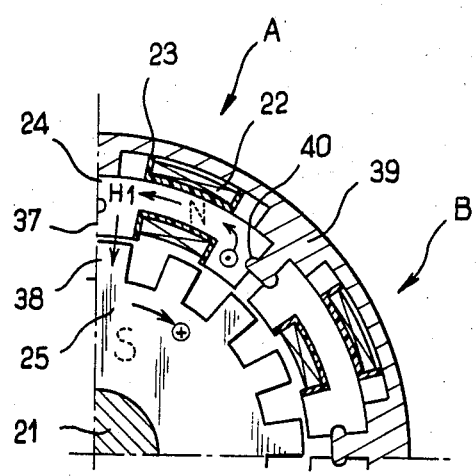
FIG_4
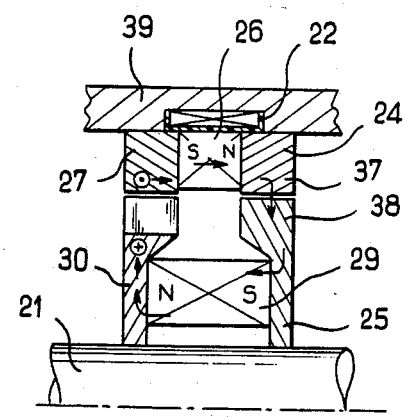
FIG_5

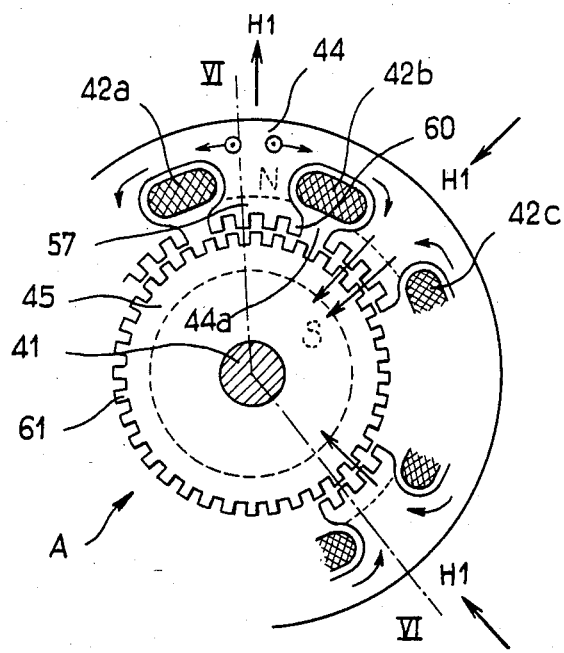
FIG_6
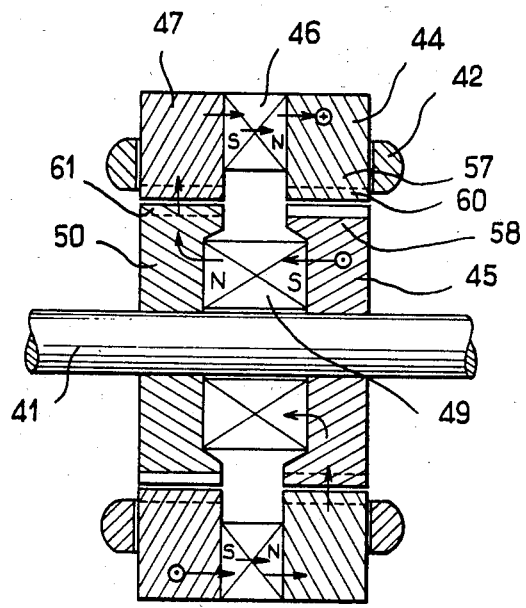
FIG_7

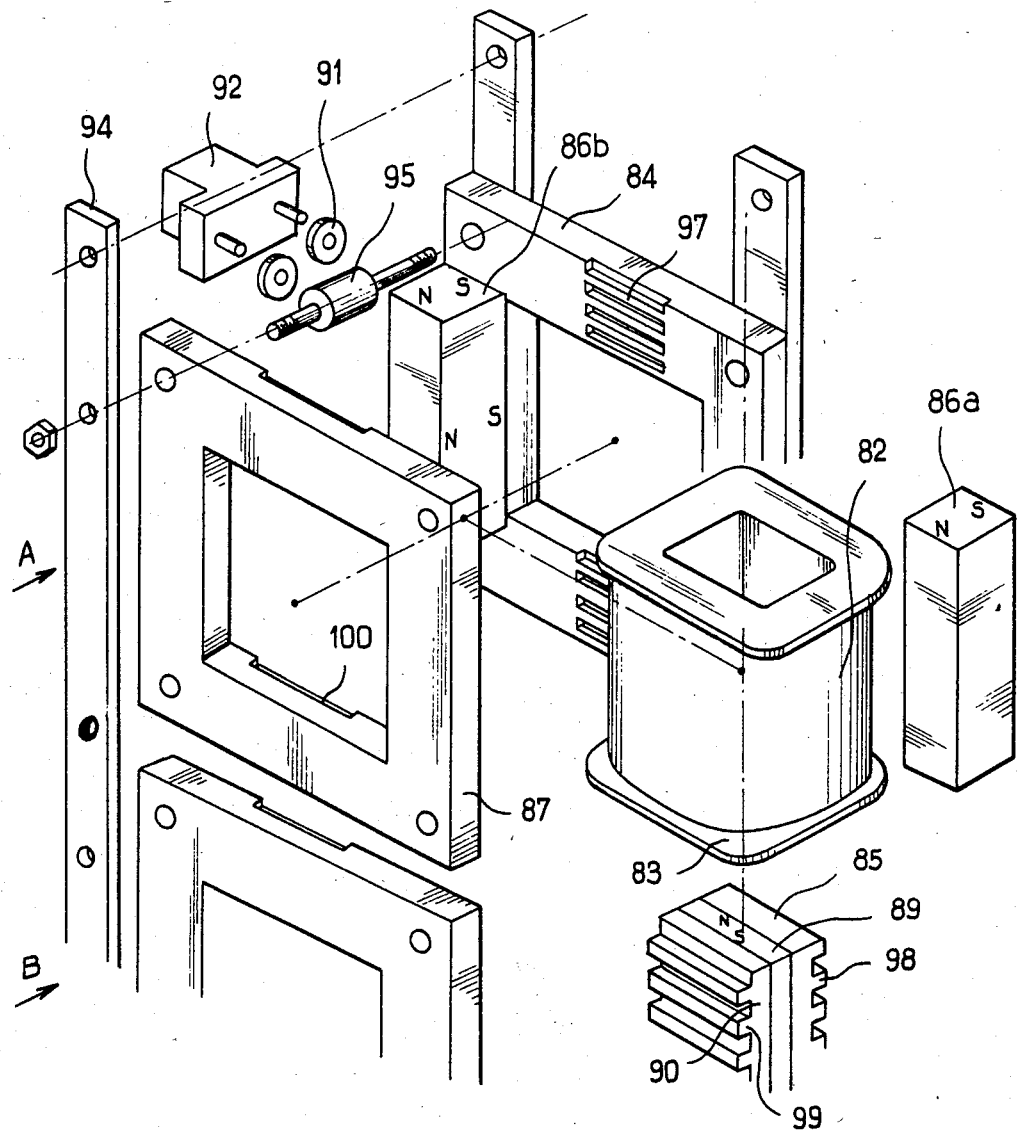
FIG_8A

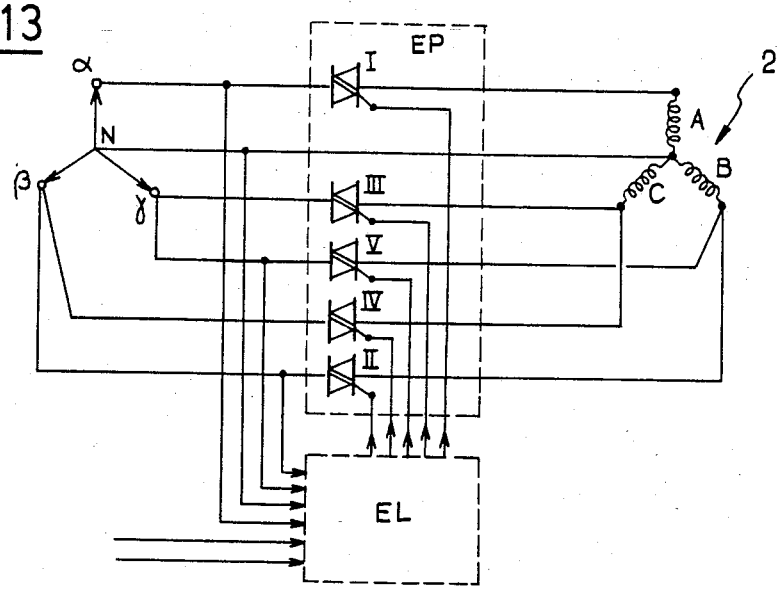
FIG_13
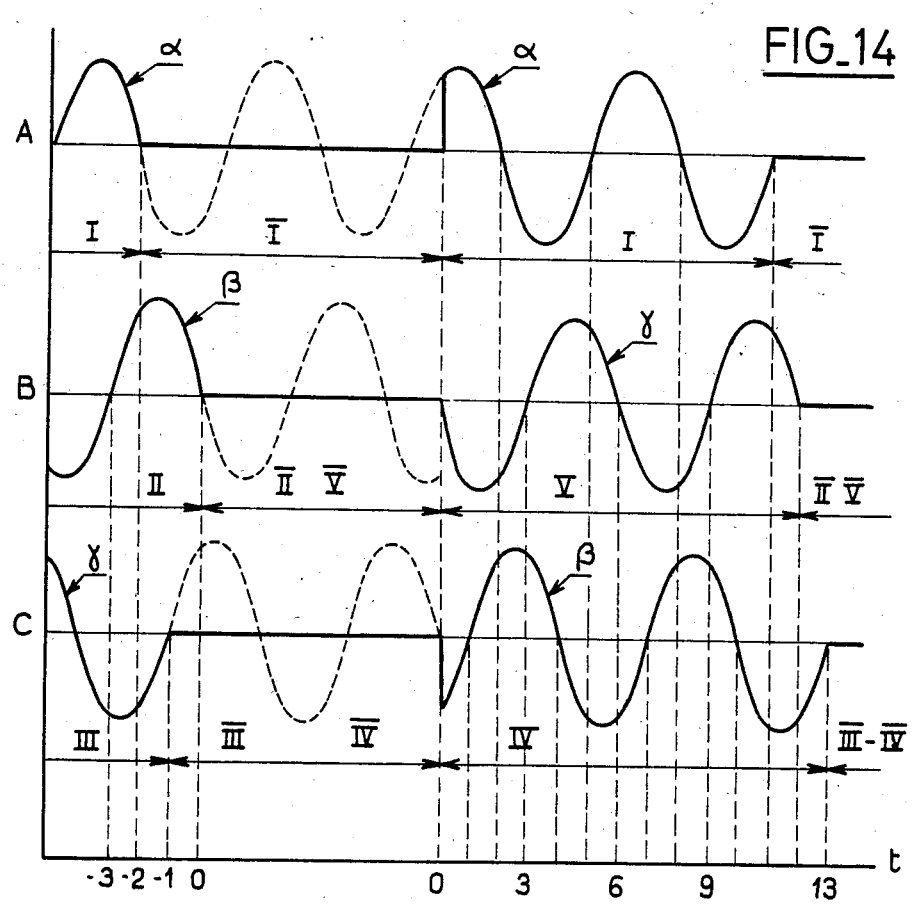
FIG_14

STEPPING MOTOR OF HYBRID MULTI-PHASE TYPE AND DEVICE FOR ITS CONTROL

The present invention relates to a stepping motor of the hybrid multi-phase type, comprising a primary element such as a stator which comprises one winding per phase, a secondary element which is displaceable with respect to the primary element and a permanent magnet the pole faces of which are equipped with two pole pieces the ends of which define gaps with the rest of the magnetic circuit in such a manner that, for certain relative positions of the primary and secondary elements a closed magnetic circuit is achieved which comprises the permanent magnet and two closed gaps.

It is known that among the rotating electric motors, three principal types of stepping motors exist:
 a first reluctance type;
 a second permanent-magnet type; and
 a third hybrid, that is to say reluctance and permanent-magnet type.

In the Revue Générale de l'Electricité, volume 91, number 3, March 1981, page 176 and following, the electrical and constructional characteristics of these motors are detailed.

The reluctance motors have the disadvantage that they do not possess residual holding (or detent) torque in the absence of excitation, so that pole steps are likely to be lost when they are stopped. The two other types of motor have holding torques which do not exceed approximately 10% of the static torque with excitation. Now, in many applications it would be worthwhile to increase this holding torque. However, if this torque is increased too much, the resultant effort required from the motor torque will generally be greater, which leads to a loss in torque and reduces the acceleration of the motor.

It is known that the stepping speed of motors of the above type is limited particularly by the coil of windings which cannot be rapidly de-energized without producing dangerous over voltages for the electronic switching device of these motors, at least if no costly precautions are taken. It is thus worthwhile to be able to reduce the variations in electromagnetic energy in the wound stator, occuring when the electric supply of this latter is cut.

Besides, it is known that it has been possible to improve the performance of a hybrid-type stepping motor by introducing a permanent magnet into the latter. It is thus worthwhile to follow this improvement by increasing, for example, the volume of the magnetized material by adjusting the gaps of the magnet and thus preventing losses of flux over long return circuits via the yokes without however increasing the inertia of the rotor.

In another area, the winding of the notches arranged in the stator of stepping motors is costly, as are the magnetic materials used for the stator, and these motors require significant manpower for assembly.

The present invention has the objective of remedying the disadvantages of known embodiments by improving the rotating stepping motors of the hybrid multi-phase type and also linear stepping motors.

The stepping motor of the hybrid multi-phase type which is the object of the invention comprises a primary element such as a stator which comprises one winding per phase, a secondary element which can be displaced with respect to the primary element and a permanent magnet, the pole faces of which are equipped with two pole pieces the ends of which define gaps with the rest of the magnetic circuit in such a manner that for certain relative positions of the primary and secondary elements a closed magnetic circuit is achieved which comprises the permanent magnet and two closed gaps.

According to the invention, this motor comprises, per phase, a second permanent magnet which is also equipped on its pole faces with two pole pieces the ends of which define gaps with the ends of the pole pieces of the first permanent magnet in such a manner that one permanent magnet is in the primary element and another in the secondary element, each gap thus being flanked by two permanent magnets, one of which is mobile and the other one fixed, one upstream of the flux circulation and the other one downstream. In this motor also, this second permanent magnet is oriented insuch a manner that the field of the winding of the corresponding phase is perpendicular to the direction of its magnetization and directed towards one or the other of the ends of each of its pole pieces defining the gaps, in such a manner as to create a flux transfer device.

According to one advantageous embodiment of the invention, the first permanent magnet is also oriented in such a manner that the field of the winding of the corresponding phase is perpendicular to the direction of its magnetization and directed towards one or the other of the ends of each of its pole pieces defining the gaps, in such a manner that the motor comprises two flux transfer devices, in series, one in the primary element and the other in the secondary element.

This arrangement allows the performance of the stepping motor to be improved and particularly to increase significantly its residual holding torque.

According to a preferred embodiment of the invention, in which the secondary element is a rotor turning around a shaft, the winding has the shape of a toroid of approximately circular cross-section, which is centered on the shaft of the motor and the fixed pole pieces have the general shape of a toroid which surrounds the winding in the fashion of a tire with respect to an air chamber whilst the mobile pole pieces have, with respect to the winding and the shaft, a shape which is analogous to that of a wheel rim equipped with a tire with respect to its air chamber and the axis of the wheel.

In this embodiment, the entire winding is surrounded by iron and is thus of optimum efficiency which is clearly higher than that of a conventional notched winding.

Moreover, in this embodiment, due to the substantially circular cross-section of the winding and to the surrounding shape of the pole pieces, the iron of the latter is as close as possible to the copper of the winding, which minimizes reluctance and magnetic leakage.

Besides, the magnets of the stator and of the rotor are as close as possible to the gaps defined by the pole pieces which increases their efficiency.

However, the present invention is not limited to rotating stepping motors but is also applicable to linear stepping motors in which one of the elements is shorter in length than the other.

According to another aspect of the invention, a first device for controlling the hybrid stepping motor according to the invention comprises an electronic circuit adapted for sending pulses to different phases of the motor, which electronic circuit comprises means for providing that, after a positioning by the excitation of certain phases in a predetermined direction, a subsequent excitation of another phase is accompanied by an inverse excitation of the previously excited phase, having an amplitude and a duration which are less than those of the said previous excitation, in such a manner as to obtain a pulse for releasing the residual holding torque of the motor.

This device allows particularly to increase the torque which is available at the motor shaft and the maximum operating rate of the motor.

A second control device allows a three-phase motor to be supplied directly from a three-phase mains supply.

Other details and advantages of the invention will also be apparent from the description below.

In the attached drawings, given as non-limiting examples:

FIG. 1 is a sectional view according to line I—I of FIG. 2 of a rotating stepping motor according to the invention;

FIG. 2 is an end view of the motor according to FIG. 1, the bearing block of the shaft of this motor having been removed;

FIG. 3 is a sectional view according to plane III—III of FIG. 1;

FIG. 4 is an axial section of a quarter of another embodiment of a rotating motor according to the invention;

FIG. 5 is a diametral half section of this motor;

FIG. 6 is an axial section of a third embodiment of a rotating motor according to the invention;

FIG. 7 is a diametral section of this motor;

FIG. 8A is an exploded perspective view of another linear motor according to the invention;

FIG. 13 is a diagram of a second control device; and

FIG. 14 is a diagram illustrating the operation of this second control device.

Figure 8:
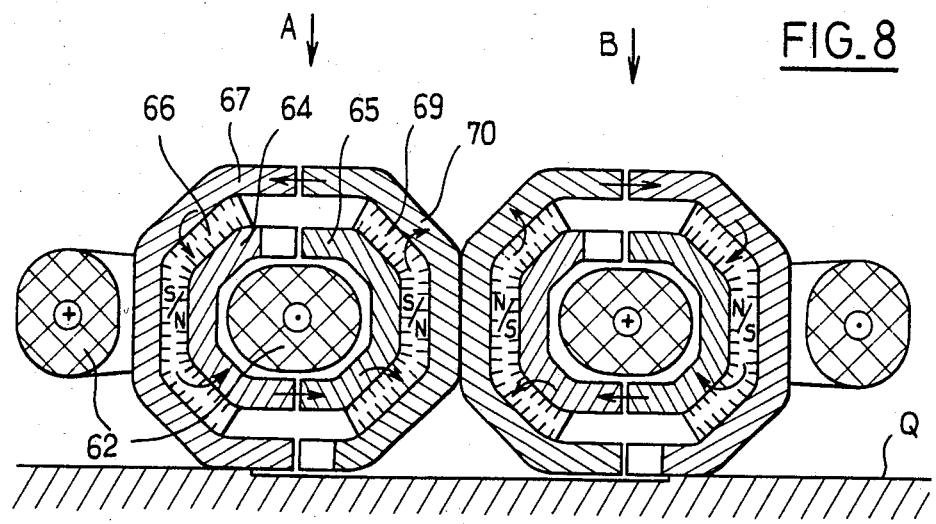
FIG. 8 is a sectional view of a linear stepping motor according to the invention according to line VIII of FIG. 9.

The rotating stepping motor of the hybrid type shown in FIGS. 1 to 3 comprises two identical phases A and B mounted on the same shaft 1 and angularly offset with respect to each other in a conventional manner. Only phase A shown in the upper part of FIG. 1 will be described.

This phase A of the motor comprises a toroidal winding 2 of substantially circular cross-section, centered on the axis of shaft 1. This winding 2 is protected on the outside by a former 3 of electrically insulating material.

Two symmetric half molds 4a, 4b of magnetic material are fitted onto each other around the winding 2 along the diametral plane P of the latter.

Assembled, these two half molds 4a, 4b form a toroid which is open to the shaft 1 and which covers the winding 2 in the fashion of a tire with respect to an air chamber.

Two other symmetric half molds 5a and 5b fitted one into the other according to the diametral plane P are arranged in the open part of the toroid formed by the two half molds 4a, 4b and thus cover the part 2a of the winding 2 which is directed towards the shaft 1. The external surface of the half molds 5a, 5b is located exactly in the projection of the half molds 4a, 4b, in such a manner that, together, these half molds form a toroid centered on the shaft 1. The arrangement of the half molds 5a, 5b with respect to the half molds 4a, 4b is equivalent to that of a wheel rim with respect to a tire.

In FIGS. 1 and 3 it can also be seen that the primary assembly formed by the winding 2, the former 3, the half molds 4a and 4b which are connected to the winding 2 by the former 3 is fixed and forms part of the stator of the motor.

In contrast, the secondary assembly formed by the half molds 5a, 5b is rigidly locked to the shaft 1 and can thus move in rotation with this shaft 1 and is thus part of the rotor of the motor.

The ends facing the half molds 4a and 5a on the one hand and the half molds 4b and 5b on the other hand are at an equal distance from the shaft 1 and are equipped with teeth such as 17, 18 (see FIGS. 1 and 3).

The structure just described significantly corresponds to that described in French Patent No. 2,549,575.

According to a significant feature of the present invention, a permanent magnet is simultaneously added to the primary fixed element and another permanent magnet to the secondary element.

It can been seen in FIGS. 1 and 3 that a fixed permanent magnet 6 covers the external surface of the half molds 4a, 4b of the stator. This permanent magnet 6 with a circular arc cross-section can be obtained from a band of magnetic rubber the length of which corresponds to the external circumference of the half molds 4a, 4b and the edges of which are notched in wedges so that they can be flattened on to the back surface of the half molds. This permanent magnet 6 is magnetized towards the center of the winding 2.

Two other halfmolds 7a, 7b known as external stator halfmolds, in contrast to the halfmolds 4a, 4b known as in-internal stator halfmolds, are fitted onto each other also following the diametral plane P and covering the assembly formed by the winding 2, the former 3, the half molds 4a, 4b and the permanent magnet 6, this latter linking these half molds 7a, 7b to the half molds 4a, 4b. This entire assembly constitutes the stator of phase A of the motor.

A hole 8 cut through the half molds 7b and 4b and through the magnet 6 allows the ends of the conducting wire (not shown) of the winding 2 to leave the motor.

According to the invention, a permanent magnet 9 is also arranged on the face directed towards the shaft 1 of the half molds 5a, 5b known as rotor halfmolds. This magnet 9 is also obtained from a magnetic rubber band and is magnetized like the magnet 6 towards the center of the winding 2.

Two other half molds 10a, 10b, known as internal rotor half molds in contrast to the external rotor half molds 5a, 5b are fitted onto each other also following the diametral plane P and covering the assembly constituted by the magnet 9 and the half molds 5a, 5b, the magnet 9 linking these latter to the half molds 10a, 10b.

The half molds 10a, 10b are traversed by a central boring in which is fitted the shaft 1 of the motor.

This shaft 1 is mounted in the bearings 11 the periphery of which is fitted in a collar 12 of non-magnetic material which, itself, is flush mounted in an opening 15a cut in an axial and annular protuberance 13 arranged on the half mold 7a.

In FIG. 2 it can also be seen that the half molds 7a and 7b comprise four tabs 14 which are set in the square circumscribing the diameter of the stator and each of which has a boring parallel to the shaft 1 in which is engaged a hollow rivet 15 allowing the axial assembly of the various half molds and of the two phases A and B of the motor and which are also used for mounting the latter.

In the example shown (see FIG. 1), the two phases A and B are fitted onto each other following a plane P₁. This assembly comprises a cylindrical bridge 16 which is part of the half mold 7b and which facilitates this assembly. This cylindrical bridge 16 advantageously comprises marks which are used for ensuring the angular indexing of the two phases A and B, while allowing this assembly to achieve good tightness which protects the gaps from dust.

In FIG. 2, which shows the top of the motor after removal of the collar 12 carrying the bearing 11, it can be seen that the end of the external stator half mold 7a directed towards the shaft 1 comprises teeth 20.

Similarly, the end of the rotor half mold 10a facing the end of the stator half mold 7a comprises teeth 19. Naturally, such teeth 19, 20 are also arranged on the ends of the half molds 7b and 10b. These teeth 19 and 20 have identical dimensions.

The cylindrical surface, on which are placed the gaps existing between the teeth 17, 18 and 19, 20, preferably has a diameter which is slightly less than the inside diameter of the former 3 of the winding 2 so that the stator and the rotor can be assembled separately.

The motor just described operates as follows:

When the winding 2 is fed in a given direction, a field with the direction H1, for example directed towards the top, is produced in its center. Naturally, this field rotates around the conductors and at the outside of the conductors it is directed towards the bottom.

When the permanent magnet 9 has a pole N next to the half molds 5a, 5b, the flux of this magnet leaves only by the teeth 18 of the half mold 5a located towards the top of FIG. 1 (see arrows). From there, this flux passes to the teeth 17 of the top half mold 4a, producing a part of the required motor torque. The pole S of the permanent magnet 6 is then directed towards the molds 4a, 4b. The flux will then traverse the permanent magnet 6 in order to re-emerge only via the teeth 20 of the bottom half mold 7b from where it rejoins via the teeth 19, the bottom half mold 10b, supplying the other part of the required motor torque and returns to the permanent magnet 9.

After inverse excitation of the winding 2, the magnetic flux successively passes through the half molds 5b, 4b, the magnet 6, the half molds 7a, 10a and the magnet 9, rotating in the opposite direction from before.

Naturally, as indicated in FIG. 1, the thickness of the half molds increases towards the shaft 1 so that a substantially cross-section of iron is maintained in the space.

It will be noted that at any point of each magnet 6, 9 the field of the winding 2 is perpendicular to the direction of magnetization of this magnet and directed towards one or the other of the ends of each pole piece (4a, 4b, 5a, 5b, 7a, 7b, 10a, 10b) defining the gaps.

This arrangement consequently produces a flux transfer device coming from one or the other of the S entrances of the magnets, to leave by one or the other of the N exits diametrically opposed to the entrance.

In the first embodiment according to the invention described above, two flux transfer devices consequently exist in series, one in the stator and the other in the rotor, which, define four rows of gaps per phase. These flux transfer devices are controlled from the same winding 2. Each gap defined by the pole pieces is flanked by two permanent magnets 6, 9, one of which is upstream and the other one of which is downstream of the flux circulation, one belonging to the stator and the other to the rotor.

Besides, all parts of the winding 2 are surrounded by iron and are thus active, whilst with a conventional notched winding only the part in the notch is active whilst the external connections or lateral leads not only do not serve any purpose but also introduce disadvantageous resistances.

Moreover, due to the almost circular cross-section of the winding 2 and of the half molds, the iron is located as close as possible to the copper of this winding, thus minimizing the reluctance and the leakage.

Finally, the magnets 6 and 9 are close to the gaps defined by the pole pieces which increases their efficiency.

The cross-sections of iron can be greater than in an equivalent conventional rotating motor and the thicknesses of iron are smaller over the greater part of the path which minimizes the iron losses. Moreover, in a given part of iron, the fluxes can only cancel each other instead of changing direction which considerably reduces the area of a hysteresis loop. In order to further diminish these losses, instead of using costly silicon plate for the half molds, it is possible to produce the latter by sintering an iron powder with very high resistance.

All these features contribute to improving the performance of the stepping motor according to the invention and to increase the residual holding (or detent) torque of the latter.

Besides, in the motor according to the invention, the rapid disconnection of a winding 2 occurs with less over voltage due to the fact that the flux of the magnets 6, 9 remains at the instant of disconnection.

With regard to the production costs, even though it is necessary to use tools which are quite costly, the manpower for assembly is however reduced and the production of the winding 2 is greatly simplified.

Without leaving the field of the invention, it would naturally be possible to apply modifications such as locating the gaps in the diametral plane P of the winding 2 (but then with axial force components) or providing the half molds with an elliptic shape.

Instead of arranging a flux transfer device at the rotor and another one at the stator of the rotating motor, it would be sufficient to have a single flux transfer device at the stator and a permanent magnet at the rotor, having an axial magnetization which is not subject to the influence of a winding. In this manner, the basic constructional arrangements of conventional hybrid stepping motors could be achieved.

Such an arrangement is shown in FIGS. 4 and 5, where about twenty has been added to the equivalent preceding designations.

In the embodiment of FIGS. 4 and 5, the two phases A and B of the motor are interleaved on the same circumference centered on the shaft 21. Phase A comprises a winding 22 wound on a winding former 23 the axis of which is perpendicular to the shaft 21 and located at a constant distance from the latter. Two pole pieces 24 and 27 are applied to the pole faces of a flat magnet 26.

These pole pieces 24, 27 are located in planes which are perpendicular to the shaft 21. The bore of the winding former 23 surrounds the central part of the assembly of pole pieces 24 and 27 and of the magnet 26.

The field H1 of the winding 22 is thus perpendicular to the axis of magnetization and directed towards the ends of the pole pieces 24 and 27. The assembly comprising the winding 22, the pole pieces 24 and 27 and the magnet 26 constitutes what has previously been called a flux transfer device. The entrances and exits of this flux transfer device are constituted by the ends of the pole pieces 24 and 27 emerging from the former 23 of the winding 22. These ends are turned towards the shaft 21 to constitute stator teeth 37.

The rotor also comprises a permanent magnet 29 which is therefore mobile. In accordance with a conventional arrangement, this magnet 29 has an annular shape, being slipped onto the shaft 21. This magnet 29 has a magnetization axis which is parallel to the shaft 21 and it is equipped on its pole faces with two pole pieces 25 and 30 which are thus perpendicular to the shaft 21. These pole pieces 25 and 30 are equipped at their periphery with rotor teeth 38 which define gaps with the stator teeth 37.

In the example of FIG. 4, 18 rotor teeth 38 exist on a rotor pole piece 25 or 30. For the sake of clarity in FIG. 4, the pole piece 30 has not been shown. Naturally, the number of teeth 38 can be higher.

It can also be seen that the flux transfer device consisting of the winding 22, its former 23 and the pole pieces 24 and 27 covers an arc extending over two steps of teeth 38 and that it is followed by a second flux transfer device which is displaced by a quarter step of teeth 38. This second flux transfer device belongs to phase B. Over the entire motor periphery, therefore, four flux transfer devices exist for each phase and can be connected in series. These flux transfer devices are maintained in position by a non-magnetic former 39 which also protects the windings 22. The flux transfer devices can be accurately positioned, for example by notches, the circuits sliding in tenons 40 which are parallel to the shaft 21. End plates equipped with bearings (not shown) are added in a conventional manner.

The motor just described operates as follows:

When the winding 22 is fed so that it produces a field H1, for example directed towards the left in FIG. 3, the flux of the permanent magnet 26 leaves via the lefthand end of the pole piece 24 which is in contact with the face N of the magnet. From the tooth 37, corresponding to this end of the stator, it passes to the tooth 38 of the pole piece 25 of the rotor, producing the required torque. From this position, the flux is propelled by the mobile permanent magnet 29 towards the pole piece 30 and on this path produces an angular displacement corresponding to one step and a half of the teeth 38 so that it comes opposite to a tooth 37 of the pole piece 27 to return to the magnet 26. Naturally, the flux of the mobile magnet 29 also recloses via three other paths in parallel with the preceding one, corresponding in the present case to three other windings of the phase A.

As in the case of the embodiment according to FIGS. 1 to 3, each gap is flanked, upstream and downstream of the flux circulation, by two permanent magnets 26 and 29, the one fixed and being a part of the stator and the other mobile and being a part of the rotor. However, in the case of FIGS. 4 and 5, the flux of the permanent magnet 29 is no longer transferred by the winding 22. This means that this flux is not prevented from passing via the teeth 37, which it is desired to deactivate, but is simply offered a more favorable passage via another tooth behind which is located a permanent magnet of opposite polarity. As a result, the efficiency of flux transfer device by the windings 22 is less than in the case of FIGS. 1 to 3. Moreover, the flux path in the iron is not circular and thus presents greater reluctance and leakage. Finally, the flux path surrounds only the internal part of the winding 22.

On the other hand, the rotor consisting of parts 25, 29 and 30 can be alternately used for phase A and for phase B, resulting in greater compactness. Besides, it is always easy to produce the winding.

A third embodiment can also be envisaged which derives from the previous one but which approaches even more closely the constructional arrangements of conventional hybrid stepping motors. This embodiment is described in the following sections, referring to FIGS. 6 and 7. In these figures, equivalent elements to those of the embodiment according to FIGS. 4 and 5 are given the same references increased by 20. However, by way of example, according to a conventional arrangement, the mobile pole pieces 45 and 50 are equipped on their periphery with teeth 61 the pitch of which is smaller than that of the ends 57 of the fixed pole pieces 44 and 47 and these ends 57 are also equipped with teeth 60 having approximately the same pitch as the teeth 61. Such an arrangement could also have been applied to FIG. 4. Moreover, a winding such as a 42a, 42b, 42c, generates at its center a field H1 which is directed towards the shaft 41 of the motor.

Besides, the entire circumference of the stator is occupied by the phase A and the stator pole pieces of the various windings 42a, 42b are linked to each other to form two rings 44 and 47. These rings have notches 44a which are open towards the inside in which are arranged in conventional manner the conductors 42a, 42b, 42c . . . so that the radial fields H1 are generated which are alternately directed towards the shaft 21 or directed in the opposite direction from this shaft.

The fixed magnets 46 can also be linked to each other to form a ring 46 of the same shape, with the exception of the teeth 60, as those of the rings 44 and 47. The magnet 46 can be easily cut from a plate of magnetic rubber. The operation of the motor according to FIGS. 6 and 7 is derived from that of the motor FIGS. 4 and 5. It is sufficient to consider that the flux transfer 22, 24, 27 of the embodiment of FIGS. 4 and 5 has been turned by 90° so that the field H1 generated in the present case is radial as between 42a and 42b. On one side of this winding, the ends of the fixed pole pieces 44 and 47 are directed towards the teeth 61 of the rotor. But on the other side, the flux encountering the outside edges of the pole pieces 44 and 47 is forced to turn down to the left and to the right in order to go around the conductors 42a and 42b, as indicated by the arrows, to return to the teeth 61 of the rotor, but in the pole zones where they are phase-shifted by one half tooth step. This detour near enough provides the operation of the embodiment according to FIGS. 4 and 5. However, in the case of FIGS. 6 and 7, the winding is more costly. By using windings of the salient pole type it would also be possible to interleave the two phases A and B or even three phases on the same stator.

Curiously, it can be noted that this third embodiment corresponds exactly to the conventional embodiment of hybrid stepping motors with a rotor with axial magnetization, with the difference that the central plates of the stator stack have been replaced by a permanent magnet of approximately the same shape. Now these plates do not play any role in the production of motor torque because their teeth are not opposite to the rotor teeth. On the contrary, they introduce parasitic reluctance.

In the preceding embodiments of rotating motors, there is only one single rotor per phase. Without leaving the framework of the invention, it would also be possible to conceive a motor having two co-axial rotors per phase of the type, for example, of the one represented in FIG. 7, and to link, by flux transfer devices which are parallel to the motor axis, mobile pole pieces belonging to the various rotors, in such a manner that the flux path has a rectangular shape with an active gap at each point of the rectangle, with two mobile magnets and their pole pieces on two opposite sides and with two fixed magnets and their pole pieces on two other opposite sides, the fixed magnets and their pole pieces being each surrounded by a winding.

Finally, in a simplified embodiment of FIGS. 4 and 5, each pole piece 25, 30 of the rotor could have only three teeth 38, the motor being equipped with a flux switching device for phase A the fixed pole pieces 24 and 27 of which are perpendicular to the shaft 21 and traversed at their center by one end of this shaft, forming a bearing, the ends of these pole pieces 24 and 27 being arched to define the gaps on the diametrically opposed parts of the rotor, and with a second flux transfer device for phase B which is identical to the former but situated on the other side of the rotor and offset by 90° with respect to the first.

The motors described above are of the rotating type. To obtain a linear motor it is sufficient to unroll mentally the cylindrical gap to make it plane and rectilinear and to take one part of the periphery of the stator and of the rotor to make of them primary and secondary rectilinear and parallel elements, one of the two having a length which is shorter than that of the other. See, for example, the journal "Machine Outil No. 287, June 1982, page 179 and following".

German Patent No. 3,338,864 shows such a linear motor of the hybrid stepping type and conventional in the sense that the winding and the single, fixed permanent magnet do not constitute a flux transfer device.

Figure 9:
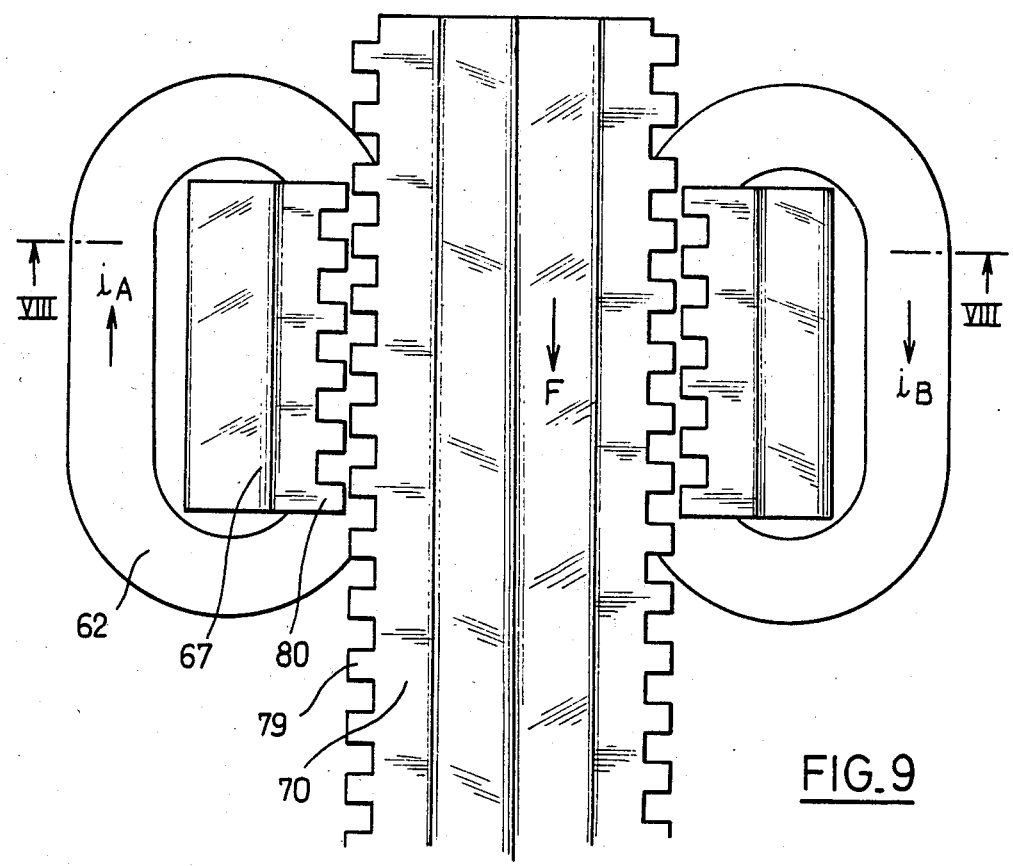
FIG. 9 is a top view of this motor.

The said transformation applied to the rotating motor of FIGS. 1 to 3 to convert it into a linear motor gives, for example, the motor shown in FIGS. 8 and 9, in which about twenty has been added to the equivalent previous references.

With the aim of simplifying the implementation, the pole pieces 64, 65, 67 and 70 have a semi-octagonal cross-section. On the inside of this octagon and thus between the primary and secondary elements are located the winding conductors 62 which close on the outside.

There are two phases A and B, the secondary elements of which have been placed back to back and the primary elements of which are fixed on a plane Q. With the aim of simplification, the means for guiding the movement of translation of the secondary elements has not been shown and in the top view of FIG. 9 only the teeth 79-80 (sic) and 80 have been shown.

It can be seen that the primary element 64-66-67 has been selected to be shorter and that the winding 62 has been closed on this element.

The operation is the same as that already described: with the currents $i_A$ and $i_B$ fluxes in the direction of the arrows of FIG. 8 and a force on the secondary elements in the direction of the arrow F of FIG. 9 are produced.

Without leaving the field of the invention, the following modifications can be carried out:

The secondary element can be made shorter, for example to reduce the inertia and the mobile part. But then the length of the winding and the consumption is increased. However, because, according to the invention, the winding can be produced either on the primary or on the secondary, a short winding can be put on the secondary but this winding is then mobile.

So that a return of the winding 22 is also useful, a second primary/secondary assembly of the same phase, located in the same axial zone, can be placed around this return. This also allows to compensate for lateral forces exerted on the mobile part.

With three phases ABC, the primary elements of these three phases can be located on the same plane Q or on two parallel planes between which the secondary elements pass. They can also be arranged in a circle on the inside of which pass the secondary elements. The various phases can also be located in different axial zones.

Instead of using the rotating motor of FIGS. 1 to 3 as a basis for transformation into a linear motor, a motor similar to the previous one can also be used but in which the magnetic circuit of the secondary element is pivoted by 90° so that the teeth 18 and 19, which were parallel to axis 1, become perpendicular to this axis, the secondary element then being displaced parallel to this axis, passing across the winding 2 of phase A and across that of phase B. Naturally, the magnetic circuit of the primary element must also be turned by 90°. After correcting the gap surfaces and rearranging the two magnets 9 from the section according to FIG. 1, one arrives at the linear motor shown in FIG. 8A on which about twenty has been added to the equivalent preceding elements. It can be seen that the secondary element consists of two linear and plane racks 85 and 90 which are separated by a plane permanent magnet 89. This secondary element moves along its axis, the teeth 98 and 99 of the racks being located on opposite external faces and being perpendicular to the direction of movement.

The winding former 83 carries the winding 82 of phase A and has an approximately rectangular core. The secondary element 85, 89, 90 passes through it.

Two pole pieces 84 and 87 of the primary element have a plane frame shape the central opening of which corresponds to the axial section of the winding former 83 parallel with the planes of the racks. These pole pieces are embedded on the winding former 83 in such a manner that the teeth 98 and 99 of the racks 85 and 90 are located opposite to arms which are perpendicular to the axis of the winding, that is to say horizontal at the top and at the bottom of each pole piece 84–87. On the corresponding faces of these arms appear the teeth 97 and 100 obtained, for example, by the milling of grooves.

Between the vertical arms opposite to the pole pieces 84 and 87 are introduced two permanent magnets 86a and 86b the axes of magnetization of which are perpendicular to the support faces and opposite to the axis of magnetization of the permanent magnet 89. These permanent magnets are thus located on either side of the winding 82 and close to this latter.

Stepped pins 95 allow the assembly 82, 83, 84, 86a, 86b, 87 constituting the primary element or stator of phase A to be maintained with accuracy.

Longitudinal members 94, also held by the pins 95 allow at least one second phase B to be positioned in the extension of phase A with an offset of a fraction of the pole pitch of the rack teeth with respect to phase A.

Spacers 92 at each end of the two longitudinal members carry means for guiding the secondary element, for example in the form of rollers or bearings 91 (the corresponding rolling path on the racks has not been shown in order to preserve clarity).

It can be noted, that the field of the winding 82 is perpendicular to the direction of magnetization of the permanent magnet 89 and directed towards one or the other of the ends of the racks 85 and 90 where the gaps with the pole pieces 84 and 87 are defined, thus constituting a flux transfer device. The same holds for the permanent magnets 86a and 86b, although in a less evident manner. In effect, on the outside and in the proximity of the winding 82 the conductors of this winding produce a field which is opposite to that created inside the winding. Since the permanent magnets 86a and 86b are placed against this winding 82, they are subjected to a field which is perpendicular to their direction of magnetization and directed towards one or the other of the ends of the pole pieces 84 and 87 where the gaps with the racks 85 and 90 are defined. With, for example, a winding field directed on its inside towards the top, the flux of the permanent magnet 89 is forced to point towards the top where it crosses a gap to pass through the top horizontal arm of the pole piece 84. From there it passes half along the vertical arms where it is trapped by the permanent magnets 86a, 86b. It is forced by the external field of the winding to point towards the bottom where it passes through the lower horizontal arm of the pole piece 87. It then crosses a gap to reach the rack 90 where it is trapped by the permanent magnet 89.

Naturally, the length of the racks corresponds to the useful path increased by the length covered by the phases. Moreover, the word frame concerning the shape of the pole pieces must be taken in its larger sense since one of the vertical arms of this frame may possibly be eliminated.

In another field, the introduction of at least one flux switching device in a stepping motor with a fixed and a mobile permanent magnet allows a new advantageous switching device for controling such a motor to be utilized.

When one phase is excited, the motor torque must overcome the residual holding (or detent) torque of the other phase, in addition to the normal load of the motor. It would be worthwhile to suppress this torque by means of electric control, especially if this torque has been increased by introducing a second permanent magnet.

Now, it is known that it is difficult to cancel the flux of a permanent magnet passing through a closed gap by means of energizing a winding. If the excitation is too weak, it is ineffective. If it is too strong, a new attraction will be generated by the leakage flux passing across the gap. The reluctance of a closed gap however is often poorly defined and variable. With a conventional motor it is therefore not possible to contemplate releasing one phase by means of inverse energization of this phase.

In contrast, with a flux transfer device, a varying degree of energization reinforces the output enabled without inverting the output not enabled, which has a flux of practically zero. With a second permanent magnet, repellent forces will even occur (the field of one permanent magnet is subjected to such a deformation that this magnet will attempt to move in order to allow its flux to flow without restriction).

Figure 10:
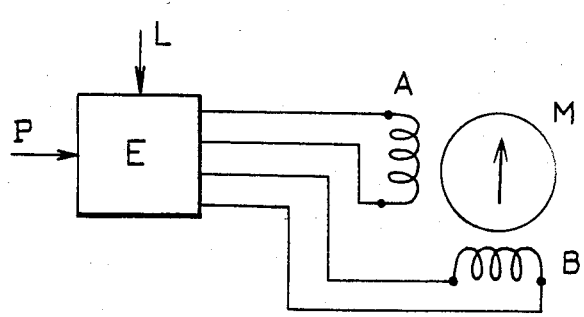
FIG. 10 is the circuit diagram of a first control device of a motor according to the invention.
Figure 11:
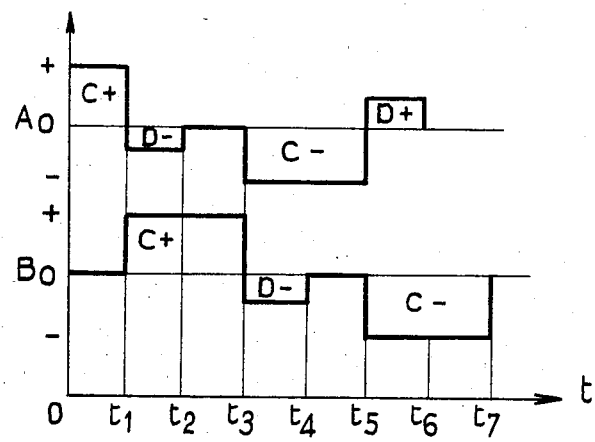
FIGS. 11 and 12 are diagrams illustrating the operation of this control device.
Figure 12:
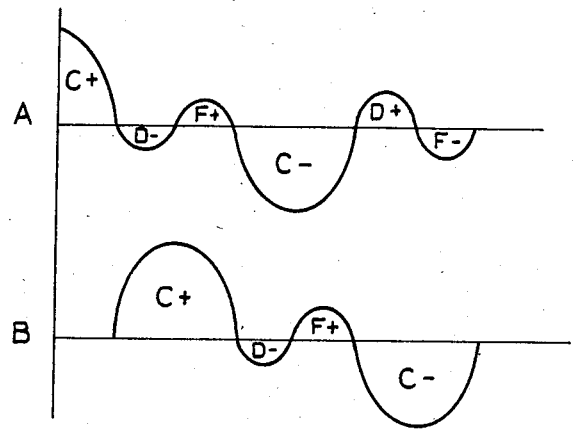

A first switching device is shown in FIGS. 10 to 12. In FIG. 10 a motor M is shown according to the invention which comprises two phases A and B. The windings of these phases are connected to an electronic control device E receiving a power supply P and a logical command L. Let us assume that a positive pulse C+ ends on phase A at time t1 as shown in FIG. 11. On phase B, for example, a pulse C+ will then be sent out from t1 to t3. But the process according to the invention also provides for a pulse D— to be sent on phase A. This pulse is used for releasing the phase A. With respect to the preceding pulse C+ on phase A, it has an opposite sign, a lower amplitude and a shorter duration t1, t2. Likewise, at time t3 it is assumed that a pulse C— is sent from t3 to t5 on phase A in order to continue the movement in the same direction. Here also, the invention provides for a pulse D— to be sent which is identical to the previous one but on B, from t3 to t4. This is followed by a pulse D+ on A from t5 to t6 when there is a pulse C— on B from t5 to t7, and so forth. It can be seen that the entire volume of the winding is thus used during the critical acceleration phase of the motor. Certainly it would be possible to have more than two phases.

In FIG. 12, the same pulses are found but these pulses have the shape of approximately sinusoidal alternations instead of rectangular pulses. Moreover, it will be noted that each pulse D+ or D— is followed by another pulse F— or F+ which is identical to the previous one but of opposite sign. It can thus be seen that in one phase a succession of positive and negative alternations are sent which are of a certain frequency but separated, at the instant of passing through zero, by a sequence of two alternations of twice the frequency, each alternation having a sign which is opposite to that of the preceding one.

These pulses F are used for braking the rotor at the instant when it approaches its equilibrium position in order to prevent oscillations from occuring around this instantaneous equilibrium position. This device thus allows the torque available on the shaft of the motor and the maximum operating frequency of the motor to be increased by preventing resonances.

Instead of having voltages of particular shapes, it is worthwhile to utilize directly multiphase network such as the three-phase mains system. A motor with a single phase winding then behaves like a homopolar motor.

In FIG. 13, showing a second switching device, the three phases of the winding 2 of the motor have been shown as A-B-C and the voltages of a three-phase network as $\alpha$-$\beta$-$\gamma$. Controlled rectifiers such as triacs I-II and III of an electronic power circuit EP allow the windings A-B-C to be fed by the 3 three-phase voltages $\alpha$-$\beta$-$\gamma$. Other triacs IV and V of EP allow the phase voltages $\beta$ and $\gamma$ to be interchanged. The stepping motor then operates like a reversible synchronous motor. However, it is also possible to have a controlled movement with indexed stop by means of an electronic logic circuit EL arranged in the following manner:

This circuit receives the phase voltages in order to detect at each instant the phase relationship of each phase with respect to a neutral point N. It also receives information concerning the number of steps n to be taken and the selected direction of rotation CW or CCW. It then fires the gates of the triacs.

In order to produce a stop, energization of the gates is ceased in order to produce a natural successive extinction of each phase. The instant at which the energization of the gates is cut is selected in such a manner that the last phase to become extinguished is that at which it is desired to stop with the pair of closed gaps corresponding to the direction of the current before the extinction.

In the example shown in the voltage/time diagram of FIG. 14, the stop occurs at time t=0 on phase B with a positive pulse. From t=−1, phase C has no longer been supplied and there has therefore been no releasing pulse on this phase which facilitates the motor.

From time t=2, phase A has no longer been supplied either and there has therefore been no releasing pulse on this phase nor a beginning of motor torque which also facilitates the motor stop. Cutting off the energization of the gates can therefore be programmed between times t=−3 and t=−2.

In FIG. 14, it has been assumed that after a period of standstill, a movement in the inverse direction of 13 steps will then be made. At the required time, therefore, phase will be switched to B at the instant where it passes through zero to a decreasing value in order to recover the sinusoidal voltage supplying B as if there had been no standstill. At the same time, phase C is fed with voltage and phase A with voltage. Instead of triacs I-II-III, the triacs I-IV-V are now conducting. It can be seen that the voltage which suddenly appears on phase A produces a motor torque until time t=+2. Similarly, on phase C, the end of a motor torque is present until time t=+1. On phase B, at the beginning a releasing torque exists which becomes a motor torque when the motor has begun to move. The stop at time t=13 is produced as previously by successive natural extinction of the phases.

It can thus be seen that the acceleration and deceleration performances are improved with respect to a motor where one single phase is fed at a time with direct-current pulses. Moreover, the electronic circuits are simplified.

Instead of having six stopping possibilities per period of the three-phase network, if a single stopping possibility is acceptable (on a given phase with a given polarity), the electronic circuit EL would be still further simplified because there would be no longer any need to store the position in memory on which the previous stop occurred.

Naturally, it is also possible to apply modifications to this switching device, such as feeding the motor with a voltage with a frequency with programmed variations.

I claim:

1. Stepping motor of the hybrid multi-phase type, comprising a primary element such as a stator which comprises one winding (2, 22, 42a, 42b, 42c, 62, 82) per phase (A, B), a secondary element which is displaceable with respect to the primary element and a permanent magnet (9, 29, 49, 69, 89) the pole faces of which are equipped with two pole pieces (5a, 5b; 10a, 10b; 25, 30; 45, 50; 65, 70, 85, 90) the ends of which define gaps with the rest of the magnetic circuit in such a manner that, for certain relative positions of the primary and secondary elements a closed magnetic circuit is achieved which comprises the permanent magnet and two closed gaps, wherein it comprises, per phase, a second permanent magnet (6, 26, 46, 66, 86a, 86b) which is also equipped on its pole faces with two pole pieces (4a, 4b; 7a, 7b; 24, 27; 44, 47; 64; 67; 84, 87) the ends of which define gaps with the ends of the pole pieces (5a, 5b; 10a, 10b; 25, 30; 45, 50; 65, 70, 85, 90) of the first permanent magnet (9, 29, 49, 69, 89) in such a manner that one permanent magnet is in the primary element and another in the secondary element, each gap thus being flanked by two permanent magnets, one of which (6, 26, 46, 66, 86a, 86b) is mobile and the other one (9, 29, 49, 69, 89) fixed, one upstream of the flux circulation and the other one downstream, and in that this second permanent magnet (6, 26, 46, 66, 86a, 86b) is oriented in such a manner that the field (H1) of the winding (2, 22, 42a, 42b, 42c, 62, 82) of the corresponding phase is perpendicular to the direction of its magnetization and directed towards one or the other of the ends of each of its pole pieces (4a, 4b; 7a, 7b; 24, 27; 44, 47; 64, 67; 84, 87) defining the gaps, in such a manner as to create a flux transfer device.

2. Motor as claimed in claim 1, wherein the first permanent magnet (9, 29, 49, 69, 89) is also oriented in such a manner that the field (H1) of the winding (2, 22, 42a, 42b, 42c, 62, 82) of the corresponding phase is perpendicular to the direction of its magnetization and directed towards one or the other of the ends of each of its pole pieces (5a, 5b; 10a, 10b; 25, 30; 45, 50; 65, 70; 85, 90) defining the gaps, in such a manner that the motor comprises, per phase, two flux transfer devices in series, one in the primary element and the other in the secondary element, which define four rows of gaps.

3. Motor as claimed in claim 2, in which the secondary element is a rotor turning around a shaft (1), wherein the winding (2) has the shape of a toroid of approximately circular cross-section, which is centered on the shaft (1) of the motor.

4. Motor as claimed in claim 3, wherein the fixed pole pieces (4a, 4b, 7a, 7b) have the general shape of a partial toroid which surrounds and opens radially inwardly toward the winding (2), and wherein the mobile pole pieces (5a, 5b; 10a, 10b) have the general shape of a partial toroid which is surrounded by and opens radially outwardly toward the winding (2) and surrounds the shaft (1).

5. Motor as claimed in claim 4, wherein each pole piece consists of two half molds (4a, 4b; 5a, 5b; 7a, 7b; 10a, 10b) fitted along the diametral plane P of the winding toroid (2).

6. Motor as claimed in claim 5, wherein the cylindrical surface on which the gaps are located has a diameter which is less than the inside diameter of the winding toroid (2) equipped with an insulating protective former (3).

7. Motor as claimed in claim 5, wherein two external stator half molds belonging to two different phases (A and B) are each equipped with cylindrical bridges (16) for allowing indexed assembly of the two phases (A and B) and wherein the two other external stator half molds belonging to these two phases (A and B) are each equipped with a cylindrical axial extension (13) in which is mounted a non-magnetic collar (12) carrying a bearing (11) on which is fitted the shaft (1).

8. Motor as claimed in claim 1, wherein, per phase, (A, B) the pole pieces (64, 67) of the primary element and the pole pieces (65, 70) of the secondary element are rectilinear, parallel and of non-curved section and between them define plane and parallel gaps, wherein the pole pieces (64, 67) of one element are shorter than those (65, 70) of the other element, wherein the winding (62) closes around one of the elements, wherein the winding conductors (63) are located between the primary and secondary elements, the winding closing on the outside around one of these elements and wherein guidance means are provided by translation of at least two secondary elements belonging to different phases (A, B), in order to produce a linear stepping motor.

9. Motor as claimed in claim 2, wherein the secondary element consists of two linear racks (85, 90) which can move along their axis and which are separated by a permanent magnet (89), the teeth (98, 99) of the racks being perpendicular to the direction of movement, wherein each phase (A, B . . . ) winding (82) is traversed by the secondary element, wherein for each phase (A, B . . . ) two pole pieces (84, 87) of the primary element have a frame shape the central opening of which corresponds to the axial cross-section of the winding former (83) parallel to the planes of the racks (85, 90), wherein these pole pieces (84, 87) are fitted onto the winding former (83) in such a manner that the teeth (98, 99) of the racks (85, 90) are located opposite arms which are perpendicular to the axis of the winding of each pole piece (84, 87) on the faces of which appear teeth (97, 100), wherein the permanent magnets (86a, 86b) are introduced between the arms of pole pieces (84, 87) which are parallel to the axis of the winding and which are opposite each other and wherein the axes of magnetization of the permanent magnets (86a, 86b) of the primary element are parallel and of opposite direction to the axis of magnetization of the permanent magnet (89) of the secondary element, in order to produce a linear stopping motor.

10. Motor as claimed in claim 1, in which the secondary element is a rotor consisting of a permanent magnet (29) of annular shape, with axial magnetization, equipped with mobile pole pieces (25, 30) which are perpendicular to the shaft (21), wherein the fixed pole pieces (24, 27) of the primary element are located respectively in the same planes as the mobile pole pieces (25, 30) and have a central part surrounded by the winding (23), the axis of which is perpendicular to the shaft (21) and located at a constant distance from this latter, and wherein it comprises several assemblies (26, 24, 27) of a permanent magnet and of fixed pole pieces arranged along the periphery of the rotor.

11. Motor as claimed in claim 1, in which the secondary element is a rotor consisting of a permanent magnet (49) of annular shape and with axial magnetization, equipped with mobile pole pieces (45, 50) which are perpendicular to the shaft (41) and in which the stator consists of plates of annular shape stacked along the axis of the shaft (41) of the motor and provided with notches in which are located the windings (42a, 42b, 42c . . . ), wherein the fixed permanent magnet (46) also has an annular shape similar to that of the fixed pole pieces (44, 47) and is interleaved at the center of the stack of plates of the stator in the axial zone where the rotor does not have teeth (58).

12. Device for controling a hybrid stepping motor as claimed in claimed 1, comprising an electronic circuit (E) adapted for sending pulses to different phases of the motor, wherein the electronic circuit (E) comprises means for providing that, after a positioning by the excitation of a certain phase in a predetermined direction, a subsequent excitation of another phase is accompanied by an inverse excitation of the previously excited phase, with an amplitude and duration which are lower than those of the said previous excitation, in such a manner as to obtain a releasing pulse for the residual holding torque of the motor.

13. Device for controling as claimed in claim 12, intended for a motor comprising two phases (A, B), the electronic circuit being adapted for sending excitation pulses having approximately the shape of positive and negative alternations originating from a sinusoidal wave form with a certain frequency, wherein the circuit comprises means for separating two alternations at the instance when they pass through zero by two alternations with twice the frequency of that of the original sinusoidal wave form, each alternation having a sign which is opposite to that of the preceding one.

14. Device for controling a hybrid stepping motor, comprising three phases (A, B, C) as claimed in claim 1, comprising an electronic logic circuit (EL) controling an electronic power circuit (EP) adapted for sending pulses to different phases of the motor, wherein the three phases ($\alpha$, $\beta$, $\gamma$) of a three-phase voltage network are each linked to one of the windings (A, B, C) of three phases of the motor, in a direct (CW) or inverse (CCW) direction by means of controlled rectifiers (I, II, III, IV, V) such as triacs, constituting the electronic power circuit (EP), wherein the electronic logic circuit (EL) drives the gates of the rectifiers (I, II, III, IV, V) in such a manner that a motor stop is produced by stopping the excitation of the controlled gates, producing the natural successive extinction of these three phases, the last phase to be extinguished being that on which it is desired to stop the closed gap, and in such a manner that a new starting of the motor is produced by a simultaneous excitation of the gates concerned at the instant of a period on the phase where the motor happens to be or where it has been previously stopped, a zero voltage and varying in the same direction as at the last extinction, and wherein the information concerning the number of steps to be carried out and the direction of rotation are supplied to the electronic logic circuit (EL) at each new movement to be carried out.

* * * * *